United States Patent [19]

Yasuhara et al.

[11] 4,169,389

[45] Oct. 2, 1979

[54] PRESSURE MEASURING DEVICE

[75] Inventors: Takeshi Yasuhara; Mitsuru Tamai; Tadanori Yuhara, all of Kawasaki, Japan

[73] Assignee: Fuji Electric Co., Ltd., Kawasaki, Japan

[21] Appl. No.: 906,170

[22] Filed: May 15, 1978

[30] Foreign Application Priority Data

May 14, 1977 [JP] Japan ................................. 52-54865

[51] Int. Cl.² ............................................. G01L 9/12
[52] U.S. Cl. ...................................... 73/718; 361/283
[58] Field of Search ................. 73/718, 724, 722, 728; 361/283

[56] References Cited

U.S. PATENT DOCUMENTS 4,072,057    2/1978    Yasuhara et al. ...................... 73/718

*Primary Examiner*—Donald O. Woodiel
*Attorney, Agent, or Firm*—Sughrue, Rothwell, Mion, Zinn and Macpeak

[57] ABSTRACT

A flexible diaphragm-type fluid-filled sensing device is made immune to thermal expansion and contraction errors by providing a constant volume first fluid chamber formed between the insulating block and a metal plate, a second chamber between the metal plate and a sealing diaphragm and a third chamber between the other surface of the block and a measuring diaphragm. The three chambers are connected by fluid passages and the sealing diaphragm is much more flexible than the measuring diaphragm so that any volumetric change in the fluid is followed by the sealing diaphragm without changing the volumes of the first or third chambers to which the electrical displacement sensing devices are attached.

5 Claims, 2 Drawing Figures

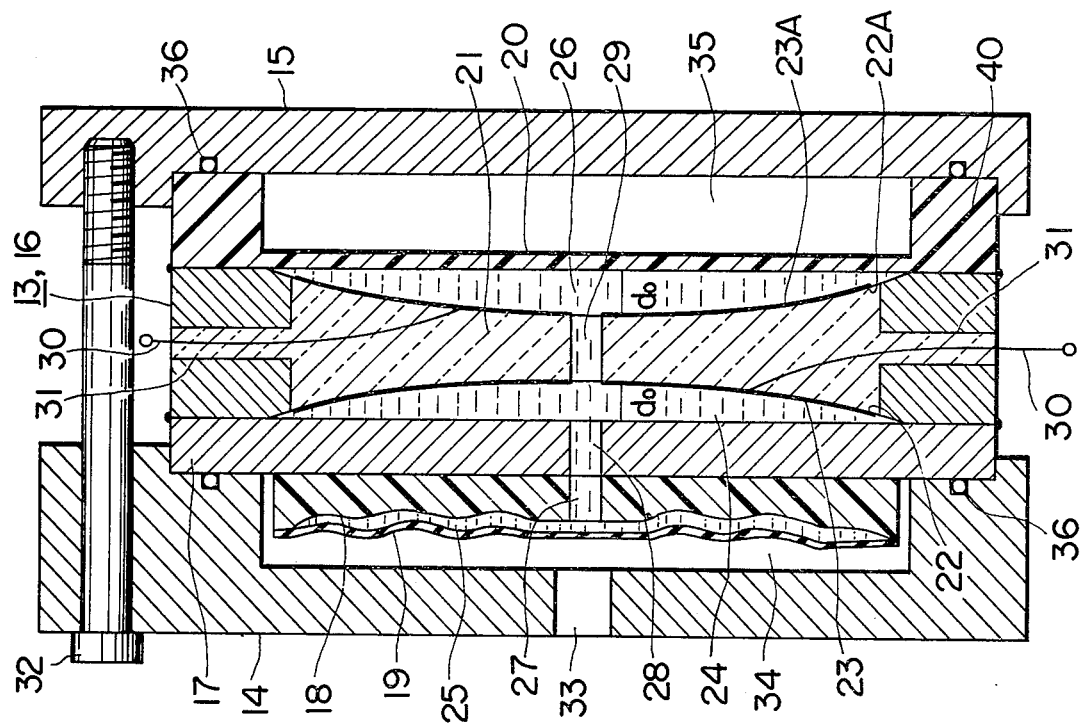
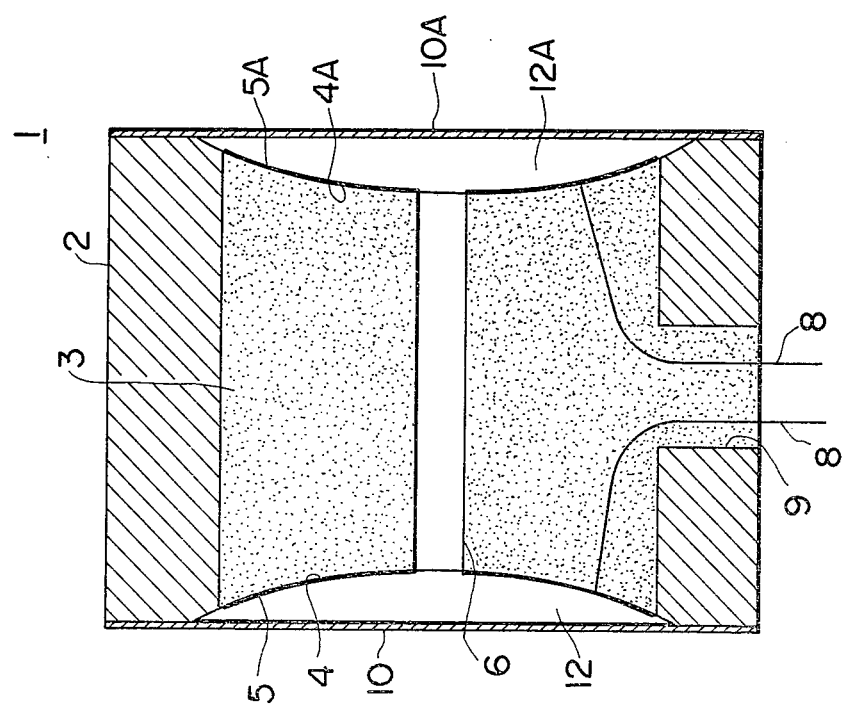

PRESSURE MEASURING DEVICE

BACKGROUND OF THE INVENTION

The present invention relates to a pressure detecting or sensing device, wherein pressure externally applied to the flexible diaphragm of a cell is electrically detected by the movement of a non-compressible filler liquid in the cell.

The known devices for sensing pressure provide an arrangement such that a couple of diaphragms are fixed to opposite cylinder openings to form a cell for containing a non-compressible filler liquid. One of the diaphragms is subjected to atmospheric pressure or vacuum pressure to establish reference pressure, while the other of the diaphragms is exposed to a pressure to be measured, and the pressure differential is measured from the displacement of the diaphragms.

To be more specific, as illustrated in FIG. 1, the pressure sensing cell consists of a hollow cylindrical member 2 made of metal which is sealed by a pair of diaphragms 10 and 10A each disposed over the open ends of the cylindrical member 2. In the cylindrical member 2, insulating filler material 3 is provided having end surfaces 4 and 4A which are spherically concave and to which metal foils 5 and 5A are applied, respectively. The diaphragms 10 and 10A have their peripheral end portions welded to both planer end surfaces of the cylindrical member 2 while the flatness of the diaphragms is maintained. Small liquid chambers each defined by the diaphragm 10 and the side surface 4 and by the diaphragm 10A and the side surface 4A are connected by a conduit 6 which penetrates the insulating material 3. These chambers and the conduit are filled with a non-compressible filler liquid such as silicone oil. The diaphragms 10 and 10A and the metal foils 5 and 5A function as variable capacitors. The metal foils are connected to conduction wires 8 which are extended outside of the device through a bore 9 formed in the hollow cylindrical member 2.

With this structure, however, the prior art devices do exhibit certain drawbacks. Particularly, thermal error is observed.

If the filler liquid is expanded due to the temperature increase, the sensing diaphragms are outwardly expanded and, therefore, the capacitances of the capacitors each defined by the foil 5 and diaphragm 10 and the foil 5A and the diaphragm 10A are varied. Further, if the filler liquid is contracted due to temperature decrease, some vacuum portion, known as Torricelli's vacuum, may be formed in the liquid chambers 12 and 12A if the inward deformation of the diaphragms can not follow the contraction and this degrades the sensing accuracy of the device.

SUMMARY OF THE INVENTION

It is therefore an object of this invention to provide a pressure sensing cell of the type described which eliminates the above-mentioned drawbacks, that is, thermal error caused by the contraction or expansion of the filler material. This object is fulfilled according to the present invention by the provision of a pressure sensing cell including an insulating block having its first and second insulating walls respectively provided with displacement detecting elements, a metal fixing plate positioned to form, in conjunction with the first insulating wall, a first liquid chamber, a relatively highly flexible sealing diaphragm covering and attached to an opposite surface of the fixed metal plate to form a second liquid chamber therebetween, and a metal-sensing diaphragm covering and fixed to the second insulating wall to from a third liquid chamber. These first, second and third chambers are filled with a non-compressible filler liquid and are in communication with each other through a first hole formed in the insulation block to connect the first and the third chambers and a second hole formed in the fixed metal plate to connect the first and the second chambers. The rigidity of the metal sensing diaphragm is higher than that of the sealing diaphragm, so that the elastic rigidity of the sensing diaphragm is ten to a hundred times as great as the sealing diaphragm. The reference pressure is applied to the sensing diaphragm and the input pressure is applied to the sealing diaphragm to transmit the input pressure to the inner surface of the sensing diaphragm, whereby input pressure is measured.

According to the present invention, if a vacuum pressure is applied to the sensing diaphragm, the input pressure is measured as an absolute pressure, while if atmospheric pressure is applied to the sensing diaphragm, the input pressure is measured as an ordinary pressure value. Further, if a second input pressure is applied to the sensing diaphragm, the device can function as a differential pressure sensing device.

BRIEF DESCRIPTION OF THE DRAWINGS

In the drawings:

FIG. 1 shows a cross-sectional view of a conventional apparatus for measuring pressure; and FIG. 2 shows a cross-sectional view of an apparatus according to the present invention.

DETAILED DESCRIPTION OF THE INVENTION

One embodiment of this invention will now be described in detail with reference to the accompanying drawings.

Reference numeral 13 designates a pressure sensing portion which comprises metal hollow cylindrical member 16, a fixing plate 17, a receiving plate 18 and a sealing diaphragm 19, all three being disposed at one end of the cylindrical member 16, and a sensing diaphragm 20 disposed at the other end of the cylindrical member 16. In the cylindrical member 16, an insulating material 21 is provided having end surfaces 22 and 22A which are spherically concave and to which electrodes 23 and 23A consisting of metal foil are secured. The fixing plate 17 made of metal is welded in an air-tight manner to the planer portion of one end of the cylindrical member 16. Alternatively, it is possible to provide an insulating material having flat end surfaces and to provide a sensing diaphragm having a spherically concave inner surface. A first liquid chamber 24 is formed by the side surface 22 of the insulating material 21 and the fixing plate 17. The chamber 24 has a maximum distance $d_o$ between the insulating material and the plate. The inner surface of the receiving plate 18 is welded at its outer periphery in an air-tight manner to an outer surface of the fixed plate 17, and the sealing diaphragm 19 is welded at its periphery in an air-tight manner to the periphery of the outer surface of the receiving plate 18 to form a second liquid chamber 25. The receiving plate 18 functions as a damper to prevent the diaphragm 19 from extreme deformation when excessive pressure is applied thereto.

A projection 40 is provided at the outer periphery of the sensing diaphragm 20 the inner surface of which is air-tightly welded to the cylindrical member 16. The space defined between the sensing diaphragm 20 and the insulating material forms a third liquid chamber 26 having a maximum distance $d_o$ therebetween. Channels 27, 28 and 29 are formed in the receiving plate 18, the fixed plate 17 and the insulating material 21, respectively, to provide fluid communication between chambers 24, 25 and 26, which are filled with a non-compressible filler liquid such as silicone oil. Further, conduction wires 30 are respectively connected to the electrodes 23 and 23A and are drawn out of the cylindrical member 16 through bores 31 formed therein. The pressure sensing portion thus constructed is housed in covers 14 and 15 held together by a bolt 32. The cover 14 includes a bore 33 which provides communication between external space and a pressure sensing chamber 34 defined by the inner peripheral surface of the cover 14 and the diaphragm 19 in order to apply an external pressure $P_1$ to be measured to the sealing diaphragm 19.

A reference pressure chamber 35 is formed by the sensing diaphragm 20 and the cover plate 15 secured to the projection 40 of the diaphragm 20. The reference pressure chamber 35 is opened to the atmosphere when the device is used as an ordinary pressure measuring device, while the chamber 35 is evacuated when the device is used as an absolute pressure sensing device. The device is maintained air-tight by an O-ring 36 interposed between the pressure sensing portion 13 and the covers 14 and 15.

In operation, when the input pressure $P_1$ is applied to the pressure chamber 34, the sealing diaphragm is deformed to transmit the pressure to the sensing diaphragm 20 via the filler liquid. A reference pressure $P_2$ is simultaneously maintained in the reference pressure chamber 35 so that a differential pressure $(P_1-P_2)$ is exerted on the sensing diaphragm 20 to deform the same. This deformation varies the distance between the sensing diaphragm 20 and the insulating material, which in turn varies the electro-static capacity $C_2$ between the electrode 23A and the sensing diaphragm 20.

On the other hand, since the distance $d_o$ between the fixed plate 17 and the electrode 23 is maintained constant, the electro-static capacity $C_1$ defined therebetween is also maintained constant. Therefore, the following formula is established.

$$C_2 = (e \cdot A)/(d_o + \Delta d) \quad (1)$$

$$C_1 = (e \cdot A)/d_o \quad (2)$$

in which,
e = dielectric constant of the filler liquid
A = effective area of the electrode
$d_o$ = distance between the electrode 23A and the sensing diaphragm 20
$\Delta d$ = the distance which the sensing diaphragm is is displaced by the differential pressure $(P_1-P_2)$ By the above formulae (1) and (2), the following formula is derived.

$$\frac{C_1 - C_2}{C_2} = \frac{\Delta d}{d_o} \propto (P_1 - P_2) \quad (3)$$

In the formula (3), if the reference pressure $P_2$ is the vacuum pressure, input pressure $P_1$ denotes absolute pressure, while if $P_2$ is atmospheric pressure, input pressure $P_1$ denotes ordinary pressure. Alternatively, the reference pressure can be substituted by another pressure to be measured, whereby the device can be used as differential pressure sensing device.

According to the present invention, the sealing diaphragm 19 has a sufficient mechanical strength to merely sustain pressure transmission to the sensing diaphragm 20 while avoiding leakage of the filler liquid. On the other hand, the sensing diaphragm 20 should be designed to have a sufficient mechanical strength so as to sustain a wide range of sensing pressures and, therefore, the sealing diaphragm 19 is ten to one hundred times as soft as the sensing diaphragm 20. Further, since the projection 40 at the periphery of the diaphragm 20 will not be deformed, the area of the diaphragm which is deformed remains a known constant. With the structure thus described, the expansion or contraction of the filler liquid due to the temperature change can be compensated for or followed by the highly flexible sealing diaphragm, so that no deformation occurs in the sensing diaphram and, therefore, the distance $d_o$ between the sensing diaphragm and the insulating material is maintained a constant regardless of the thermal volumetric change of the filler liquid. Thus, the electrostatic capacity $C_2$ between the sensing diaphragm 20 and the electrode 23 is maintained constant, whereby extremely accurate sensing is realized in response to input pressure. In the employment of this device for measuring ordinary pressure by providing atmospheric pressure to the reference pressure chamber, it is possible to achieve a measuring range of from 20 to 1000 kg/cm$^2$.

In the above mentioned embodiment, though the electrodes 23 and 23A are provided to detect the change of the electrostatic capacity, it is possible instead to use induction coils provided at the respective end surfaces 22 and 22A of the insulating material 21. Each of the induction coils could form one leg of a brige circuit for measuring AC current. Thus, high or low magnetic permeable material would be used for the sensing diaphragm 20 and fixed plate 17. If a sensing diaphragm having a high magnetic permeability is used, the displacement of the sensing diaphragm changes the effective impedance of the magnetic circuit, while if a sensing diaphragm having low magnetic permeability is used, the sensing diaphragm acts as a short circuit which generates eddy currents. The eddy currents will hinder the induction coil current, thus obtaining an impedance variation of the induction coil. Such an arrangement is known in the art and is described in U.S. patent application Ser. No. 708,251.

The cylindrical member 16 and the insulating material 21 should not be limited to the configuration as illusrated in FIG. 2, but the insulating material may have any configuration such as a block form that has first and second insulating walls on which displacement detecting elements may respectively be provided.

What is claimed is:
1. A pressure measuring device comprising:
  (a) a block member having first and second insulating walls, said walls being respectively provided with displacement detecting elements,
  (b) a metal fixing plate covering the first insulating wall to provide a first liquid chamber defined therebetween,
  (c) a sealing diaphragm covering the metal fixing plate to provide a second liquid chamber defined therebetween, said sealing diaphragm being exposed to an input pressure,

(d) a metal sensing diaphragm covering the second insulating wall to provide a third liquid chamber defined therebetween, said sensing diaphragm being exposed to a reference pressure, said sealing diaphragm being extremely flexible in comparison with the metal sensing diaphragm, (e) a first hole formed in the block member to provide fluid communication between the first chamber and the third chamber, (f) a second hole formed in the fixed plate to provide fluid communication between the first chamber and the second chamber, and (g) a non-compressible fluid sealed within and filling the first, second, and the third chambers.

2. A pressure measuring device as defined in claim 1, wherein the elastic regidity of the seal diaphragm is ten to a hundred times less than that of the sensing diaphragm.

3. A pressure measuring device as claimed in claims 1 or 2, wherein the reference pressure is vacuum pressure.

4. A pressure measuring device as claimed in claims 1 or 2, wherein the reference pressure is atmospheric pressure.

5. A pressure measuring device as claimed in claims 1 or 2, wherein the reference pressure is a second input pressure, whereby differential pressure is measured by the device.

* * * * *